United States Patent Office 3,233,355
Patented Feb. 8, 1966

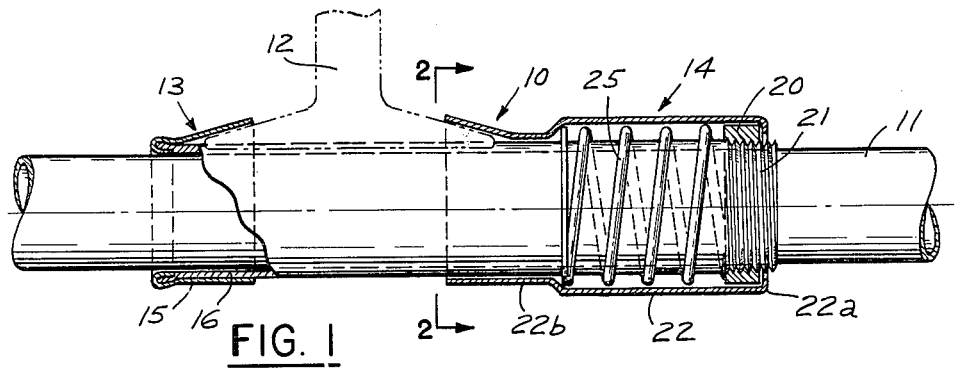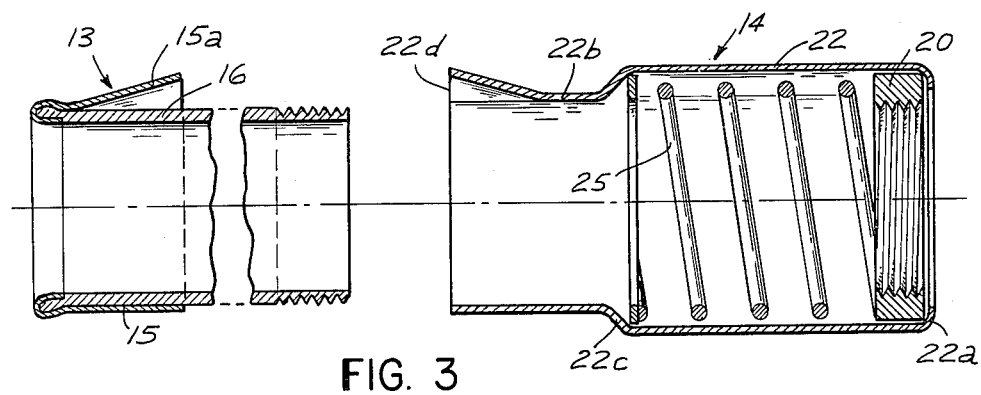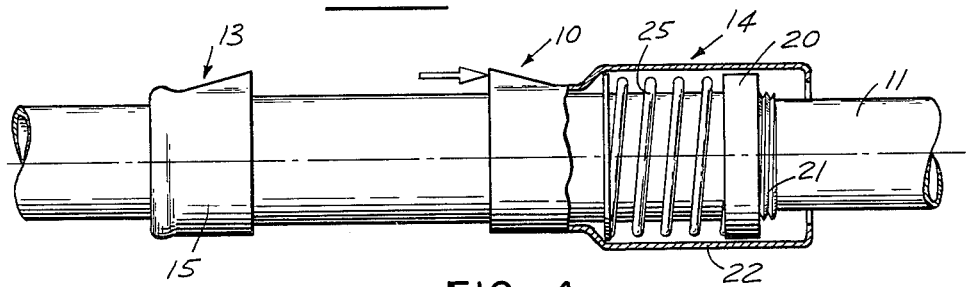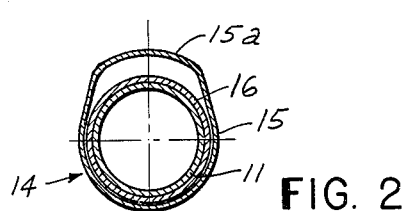

3,233,355
REEL SEAT FOR FISHING ROD
Christ Chion, Plainview, N.Y., assignor to T.O.D. Manufacturing Co., Inc., Hicksville, N.Y., a corporation of New York
Filed Feb. 19, 1964, Ser. No. 346,040
4 Claims. (Cl. 43—22)

The present invention relates to a reel seat for fishing rods, and particularly to a reel seat for detachably securing the reel with its foot to the rod.

It is an object of the invention to provide a novel and improved reel seat, by means of which the reel can be rapidly and safely secured to the rod and detached therefrom without loosening or tightening any fastening means.

A more specific object of the invention is to provide a novel and improved reel seat which secures the reel automatically in its correct position in reference to the reel seat and the rod.

Another more specific object of the invention is to provide a novel and improved reel seat, by means of which the reel is safely locked to the rod without requiring the manipulation of screws or any similar fastening means, thereby making the locking function of the reel seat independent of the skill or care applied by the user.

Still another object of the invention is to provide a novel and improved reel seat which provides for fastening of the reel to the rod by the snap action of a first loaded and then released spring.

Other and further objects, features and advantages of the invention will be pointed out hereinafter and set forth in the appended claims constituting part of the application.

In the accompanying drawing a preferred embodiment of the invention is shown by way of illustration and not by way of limitation:

FIG. 1 is a sectional view of a reel seat according to the invention mounted on a fishing rod, FIG. 2 is a section taken on line 2—2 of FIG. 1, FIG. 3 is a sectional view of the components of the reel seat on an enlarged scale, and FIG. 4 is a view partly in section of the reel seat showing the same in an operational position different from that shown in FIG. 1.

Turning now to the figures in detail, there is shown in FIG. 1 an exemplified reel seat 10 secured on a fishing rod 11 for receiving and detachably securing a fishing reel of any suitable design. The fishing reel is merely indicated by its foot 12 as the structure of the reel itself is not essential for the understanding of the invention. The reel seat comprises a first receiving member 13 and a second receiving member 14.

Receiving member 13 is in the form of a sleeve 15 generally made of a sheet metal of suitable gauge and fixedly secured to an intermediate sleeve 16 by any suitable means such as a beaded-over rim. Part of the wall of sleeve 15 is circumferentially widened to form a pocket 15a of generally triangular or wedge-shaped cross section to accommodate one-half of the reel foot, as is shown in FIG. 1.

The second receiving member 14 comprises a mounting member 20 in the form of an internally threaded ring which is threaded on a threaded portion 21 provided on intermediate sleeve 16. Mounting ring 20 serves to determine the lengthwise spacing of the second receiving member in respect to the first receiving member. As it is evident, the position of the ring 20 is adjustable within the limits determined by threaded portion 21. A sleeve 22 made of suitable sheet metal is fitted upon ring 20.

The sleeve is turned over at one end at 22a to retain ring 20 within the sleeve and it is constricted at 22b to form an internal shoulder at 22c. Sleeve portion 22b is peripherally widened similar to sleeve 15 to form a pocket 22d for receiving the other half of the reel foot, as shown in FIG. 1. A loaded coil spring 25 is fitted within the sleeve portion limited by shoulder 22c and ring 20. The spring abuts at one end against stationary ring 20 and at the other end against shoulder 22c of the sleeve, thereby urging the latter into the position shown in FIG. 1, that is, as close as possible to sleeve 15. This position is the locking position of the reel seat.

To insert a reel foot into the reel seat or to release a reel foot from the locked position shown in FIG. 1, sleeve 22 is pulled back against the action of spring 25 in the direction indicated by the arrow. As it is apparent from FIG. 4, sleeve 22 will then perform a lengthwise sliding movement in respect to mounting ring 20 thereby correspondingly increasing the clear space between the facing rims of sleeves 15 and 22. After insertion or removal of the reel foot, sleeve 22 is simply released, whereupon spring 25 will snap sleeve 22 back into the position of FIG. 1.

While the invention has been described in detail with respect to a certain now preferred example and embodiment of the invention, it will be understood by those skilled in the art, after understanding the invention, that various changes and modifications may be made without departing from the spirit and scope of the invention, and it is intended therefore to cover all such changes and modifications in the appended claims.

What is claimed as new and desired to be secured by Letters Patent is:

1. A reel seat for detachably fastening a fishing reel to a fishing rod, said reel seat comprising a first reel receiving member including a sleeve fixedly attachable upon a fishing rod and encompassing the same and a second reel receiving member, said second receiving member including a second sleeve fittable upon the rod to define an annular pocket between the second sleeve and the rod, a mounting ring mounted within said second sleeve in a lengthwise slidable relationship therewith, said ring being attachable upon the fishing rod in lengthwise adjustable relationship therewith and encompassing the rod at a selected distance from said first receiving member when the same is attached to the rod, and a spring disposed within the second sleeve and occupying said pocket, said spring abutting against said mounting ring and said second sleeve to urge the latter into a predetermined lengthwise position in reference to the mounting ring, said sleeves having at the ends facing each other, when the sleeves are assembled on the rod, peripherally widened portions forming pockets for receiving and retaining a reel foot, said spring urging the second sleeve towards the first sleeve and into said predetermined position, said predetermined position constituting the locking position of the second receiving member.

2. A reel seat for detachably fastening a fishing reel to a fishing rod, said reel seat comprising a first reel receiving member including a sleeve fixedly attachable upon a fishing rod and encompassing the same and a second reel receiving member, said second receiving member including a second sleeve, a mounting ring attachable to the rod and lengthwise adjustable in reference thereto for securing said ring at a selected distance in reference to said first receiving member, said second sleeve encompassing said ring and being lengthwise slidable between two predetermined limit positions in reference to the ring, one of said positions constituting the release position and the other the locking postion of the second receiving member, and a spring within said second sleeve abutting at one end against said mounting ring and at the other end against an inner wall portion of said second sleeve to urge the latter into its locking position, said sleeves having at the ends facing each other, when the sleeves are assembled on the rod, peripherally widened portions forming pockets for receiving and retaining a reel foot, said second sleeve being lengthwise retractable in reference to the first sleeve against the action of said spring to move said second sleeve from the locking position into the release position.

3. A reel seat according to claim 2 wherein said second sleeve has at its end opposite the end including the pocket an inwardly turned flange forming an abutment for said mounting ring and an internal shoulder intermediate the length of the second sleeve to form an abutment for the other end of the spring.

4. A reel seat according to claim 2 wherein said mounting ring comprises an internally threaded ring for threading the ring upon an externally threaded mounting sleeve fixedly attachable on the rod to secure the ring at the selected distance from the first receiving member when the latter is fixedly attached to the rod.

References Cited by the Examiner
UNITED STATES PATENTS

| | | | |
|---|---|---|---|
| 951,731 | 3/1910 | Haskell | 43—22 |
| 2,182,409 | 12/1939 | Richards | 43—22 |

FOREIGN PATENTS

| | | |
|---|---|---|
| 101,930 | 7/1941 | Sweden. |
| 887,476 | 1/1962 | Great Britain. |

SAMUEL KOREN, *Primary Examiner.*

ABRAHAM G. STONE, *Examiner.*